US010579233B2

(12) United States Patent
Lefor et al.

(10) Patent No.: US 10,579,233 B2
(45) Date of Patent: Mar. 3, 2020

(54) TRANSPARENT MESSAGING

(71) Applicant: Microsoft Technology Licensing, LLC, Redmond, WA (US)

(72) Inventors: Todd Randall Lefor, Fargo, ND (US); Monique Renea Sauvageau, Fargo, ND (US); Brian Russell Glaeske, Fargo, ND (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 195 days.

(21) Appl. No.: 15/052,415

(22) Filed: Feb. 24, 2016

(65) Prior Publication Data

US 2017/0242567 A1 Aug. 24, 2017

(51) Int. Cl.
*G06F 3/048* (2013.01)
*G06F 3/0484* (2013.01)
*G06F 3/0481* (2013.01)

(52) U.S. Cl.
CPC ........ *G06F 3/04842* (2013.01); *G06F 3/0481* (2013.01)

(58) Field of Classification Search
CPC .......... G06F 3/00; G06F 3/048; G06F 3/0481; G06F 3/0484; G06F 3/0488; G06F 9/4443; G06F 9/445; G06F 15/16; G09G 3/00; G09G 3/02; G09G 3/08
See application file for complete search history.

(56) References Cited

U.S. PATENT DOCUMENTS

| 6,002,397 A | 12/1999 | Jaaskelainen, Jr. |
| 6,459,440 B1 | 10/2002 | Monnes et al. |
| 6,853,390 B1 * | 2/2005 | Wandersleben ...... G06F 3/0481 715/802 |
| 7,765,488 B2 | 7/2010 | Pagan |

(Continued)

FOREIGN PATENT DOCUMENTS

EP 0344082 B1 11/1989

OTHER PUBLICATIONS

International Search Report and Written Opinion issued in Published PCT Application No. PCT/US2017/018360 dated Jun. 22, 2017.

(Continued)

*Primary Examiner* — Xiomara L Bautista
(74) *Attorney, Agent, or Firm* — Workman Nydegger

(57) ABSTRACT

Allowing a user to navigate data in a user interface when a modal dialog box has been activated. A method includes displaying a graphical user interface window. The method further includes allowing user input for modifying a particular data in the graphical user interface window. Thereafter, the method further includes displaying a modal dialog superimposed and obscuring at least a portion of the graphical user interface window, including obscuring at least a portion of the data, and to prevent user input for modifying the data in the graphical user interface window so long as the modal dialog remains active. The method further includes identifying information indicating that the modal dialog should be hidden. The method further includes at least partially hiding the modal dialog revealing at least a portion of the obscured data, while continuing to prevent user input for modifying the data in the graphical user interface window.

20 Claims, 8 Drawing Sheets

(56) References Cited

U.S. PATENT DOCUMENTS

| | | |
|---|---|---|
| 7,956,869 B1 | 6/2011 | Gilra |
| 7,987,425 B2 | 7/2011 | Lim et al. |
| 8,495,514 B1 | 7/2013 | Ludolph et al. |
| 8,701,029 B2 | 4/2014 | Havivi |
| 9,158,443 B2 | 10/2015 | Brown et al. |
| 2003/0011639 A1* | 1/2003 | Webb .................... G06F 3/0481 715/808 |
| 2006/0253799 A1* | 11/2006 | Montroy ................ G06F 16/958 715/809 |
| 2010/0077344 A1* | 3/2010 | Gaffney ................ G06F 3/0481 715/788 |
| 2010/0332989 A1 | 12/2010 | Havivi |
| 2013/0145314 A1* | 6/2013 | Dhar .................... A61B 6/4405 715/803 |
| 2013/0328923 A1 | 12/2013 | Danton et al. |
| 2014/0068498 A1* | 3/2014 | Olsen ...................... G06F 11/32 715/781 |
| 2014/0085233 A1* | 3/2014 | Sudo ..................... G06F 3/0488 345/173 |
| 2014/0173711 A1* | 6/2014 | Zlatarev .............. H04L 63/0815 726/8 |
| 2014/0189585 A1 | 7/2014 | Brush et al. |
| 2016/0219078 A1* | 7/2016 | Porras ................... G06F 9/4443 |
| 2017/0177556 A1* | 6/2017 | Fay ....................... G06F 17/241 |

OTHER PUBLICATIONS

Feronato, Emanuele., "Create a Lightbox effect only with CSS—no javascript needed", Published on: Aug. 22, 2007 Available at: http://www.emanueleferonato.com/2007/08/22/create-a-lightbox-effect-only-with-css-no-javascript-needed/.

"Modal window", Retrieved on: Jan. 25, 2016 Available at: https://en.wikipedia.org/wiki/Modal_window_(see_e.g.,_bottom_sections_on_problems_and_recommendations).

"Form.ShowDialog Method ()", Retrieved on: Jan. 25, 2016 Available at: https://msdn.microsoft.com/en-us/library/c7ykbedk(v=vs.110).aspx.

"Form.Modal Property", Retrieved on: Jan. 25, 2016 Available at: https://msdn.microsoft.com/en-us/library/system.windows.forms.form.modal(v=vs.110).aspx.

* cited by examiner

TRANSPARENT MESSAGING

BACKGROUND

Background and Relevant Art

Computers and computing systems have affected nearly every aspect of modern living. Computers are generally involved in work, recreation, healthcare, transportation, entertainment, household management, etc.

Many computers are intended to be used by direct user interaction with the computer. As such, computers have input hardware and software user interfaces to facilitate user interaction. For example, a modern general purpose computer may include a keyboard, mouse, touchpad, camera, etc. for allowing a user to input data into the computer. In addition, various software user interfaces may be available.

Examples of software user interfaces include graphical user interfaces, text command line based user interface, function key or hot key user interfaces, and the like. In graphical user interface, users may be presented in a graphical user interface window that presents a data to the user. Various conditions may cause a modal dialog to be displayed. The modal dialog will interrupt state machine processing for an application displaying the graphical user interface window until a user addresses the modal dialog.

Often, when the user is interrupted with a modal dialog they cannot see the content underneath the modal dialog. In some cases, this can even prevent the user from ascertaining a proper action to take to address the modal dialog.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment. The method includes acts for allowing a user to navigate data in a user interface when a modal dialog box has been activated. The method includes displaying a graphical user interface window. The method further includes allowing user input for modifying a particular data in the graphical user interface window. Thereafter, the method further includes displaying a modal dialog superimposed and obscuring at least a portion of the graphical user interface window, including obscuring at least a portion of the data, and to prevent user input for modifying the data in the graphical user interface window so long as the modal dialog remains active. The method further includes identifying information indicating that the modal dialog should be hidden. As a result, the method further includes at least partially hiding the modal dialog revealing at least a portion of the obscured data, while continuing to prevent user input for modifying the data in the graphical user interface window.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments herein implement a system where an interrupting screen, such as a modal dialog, may obscure at least a portion of a form, such as a graphical user interface window, and at least a portion of a data presented in the form. The system can identify some predetermined user input. As a result of the user input, the system causes the at least a portion of the data to be revealed. For example, in some embodiments, a simple gesture (such as mouse click and hold on a context area) may be performed that causes the modal dialog to become invisible, or at least less opaque, allowing the user to see the content underneath the modal dialog and to make a better informed decision about how to address the modal dialog.

Thus, for example, through the course of use of a computer system, a user may be interrupted and notified of an unexpected or failed action. Other times, the user may be asked to quickly add some contextual information to allow processing to continue.

In some systems, the user will be presented with a screen or window, i.e., a modal dialog that is placed on top of another screen or window, e.g., a graphical user interface window. The computer system, and hence the user, cannot proceed along some logical processing path until the interrupting screen is dismissed or responded to. In these cases, the interruption is necessary because the system cannot proceed along the logical processing path until the user makes a decision about the action or supplies some required information. In some embodiments, this is implemented by implementing a modal dialog as the interrupting screen, where the modal dialog prevents processing from continuing along the logical processing path until the modal dialog is dismissed or appropriate information is provided to the modal dialog. Indeed, in some embodiments, the modal dialog will intercept any user input and ignore or discard input that is not appropriate for dismissing the modal dialog or providing needed information.

Embodiments allow for some simple user action, other entity action, and/or automatic action, that will (while enacted) temporarily hide the interrupting message or notification allowing the user to see the form that was active just prior to the interruption. The ability to see the prior (or partially obscured) form allows the user to have a better understanding of the issue causing the interruption or needed information by being able to see the previously obscured information, allowing the user to address any issue or supply any needed information to allow processing to continue on the logical processing path.

Thus, for example, embodiments may temporarily hide a window under the user's control, while not interrupting the current task, or impinging upon an immediate required action.

Figure 1A:
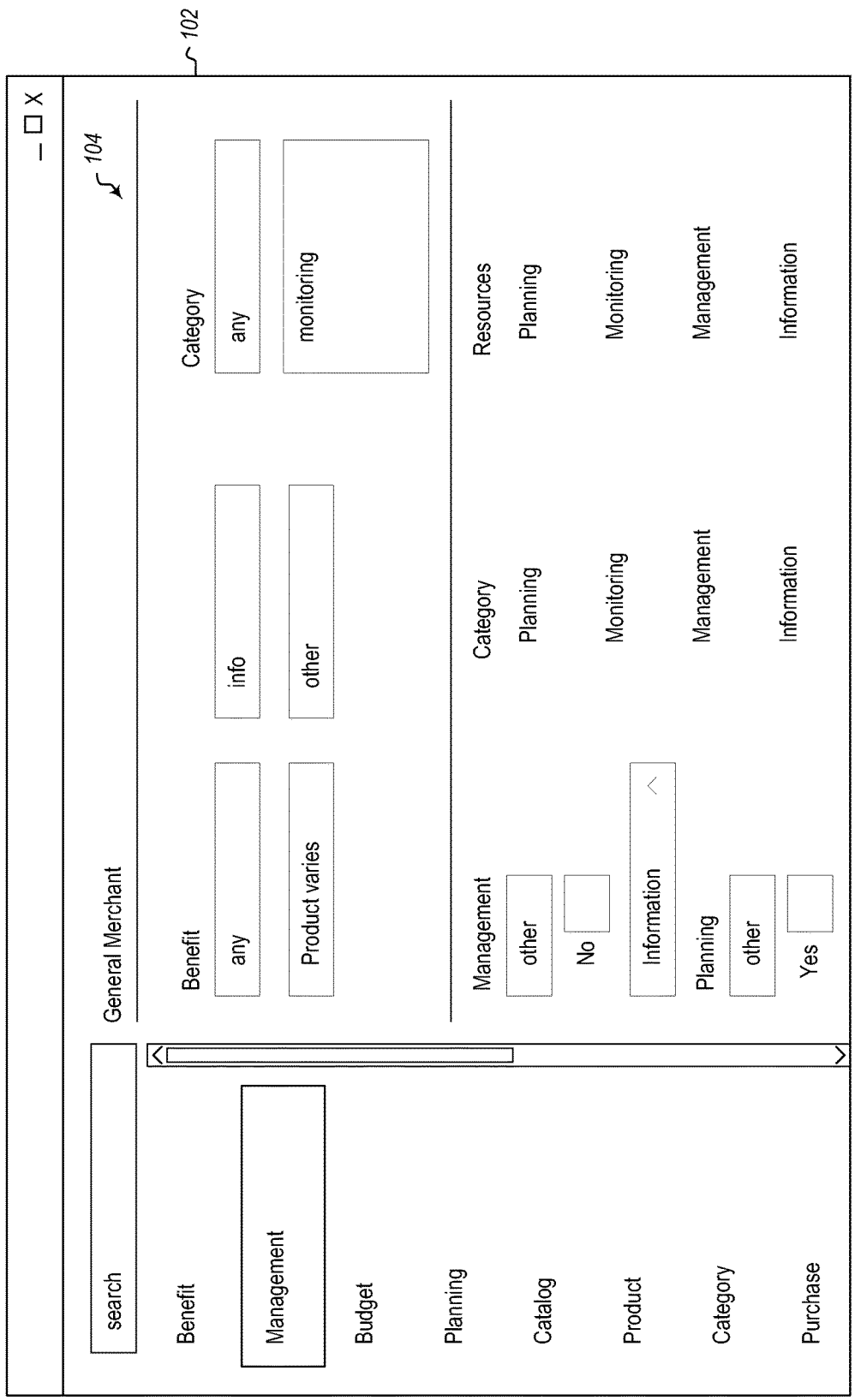
FIG. 1A illustrates a graphical user interface window.

An example is illustrated in FIG. 1A through 1E. FIG. 1A illustrates a graphical user interface window 102. The graphical interface window includes a data 104. Using interface elements, the user can interact with the data including navigating the data and modifying (i.e., adding to, deleting from, or changing) the data.

Figure 1B:
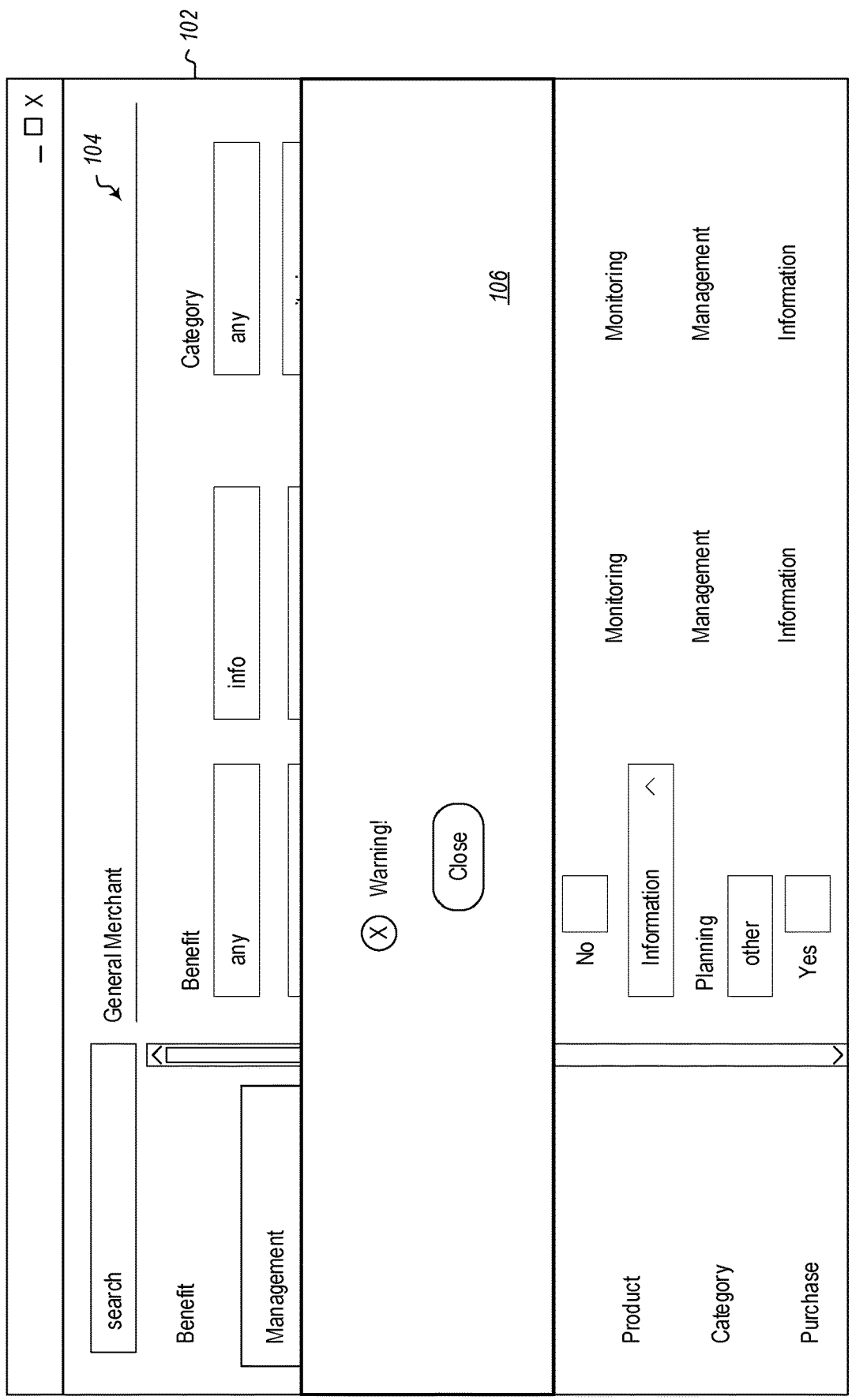
FIG. 1B illustrates the graphical user interface window with a modal dialog.

As illustrated in FIG. 1B, a user is interrupted with a critical issue. This causes a modal dialog 106 to be rendered on top of the graphical user interface window 102 and at least a portion of the data 104. In user interface design, a modal dialog is a graphical control element subordinate to an application's main window which creates a mode where the main window cannot be used. The modal dialog is a child element that requires users to interact with it before it can return to operating the parent application, thus preventing workflow on the application's main window. Thus, the modal dialog 106 will prevent user input from modifying the data rendered in the graphical user interface window 102 and prevent the application associated with the graphical user interface window 102 from proceeding along some logical processing path.

Figure 1C:
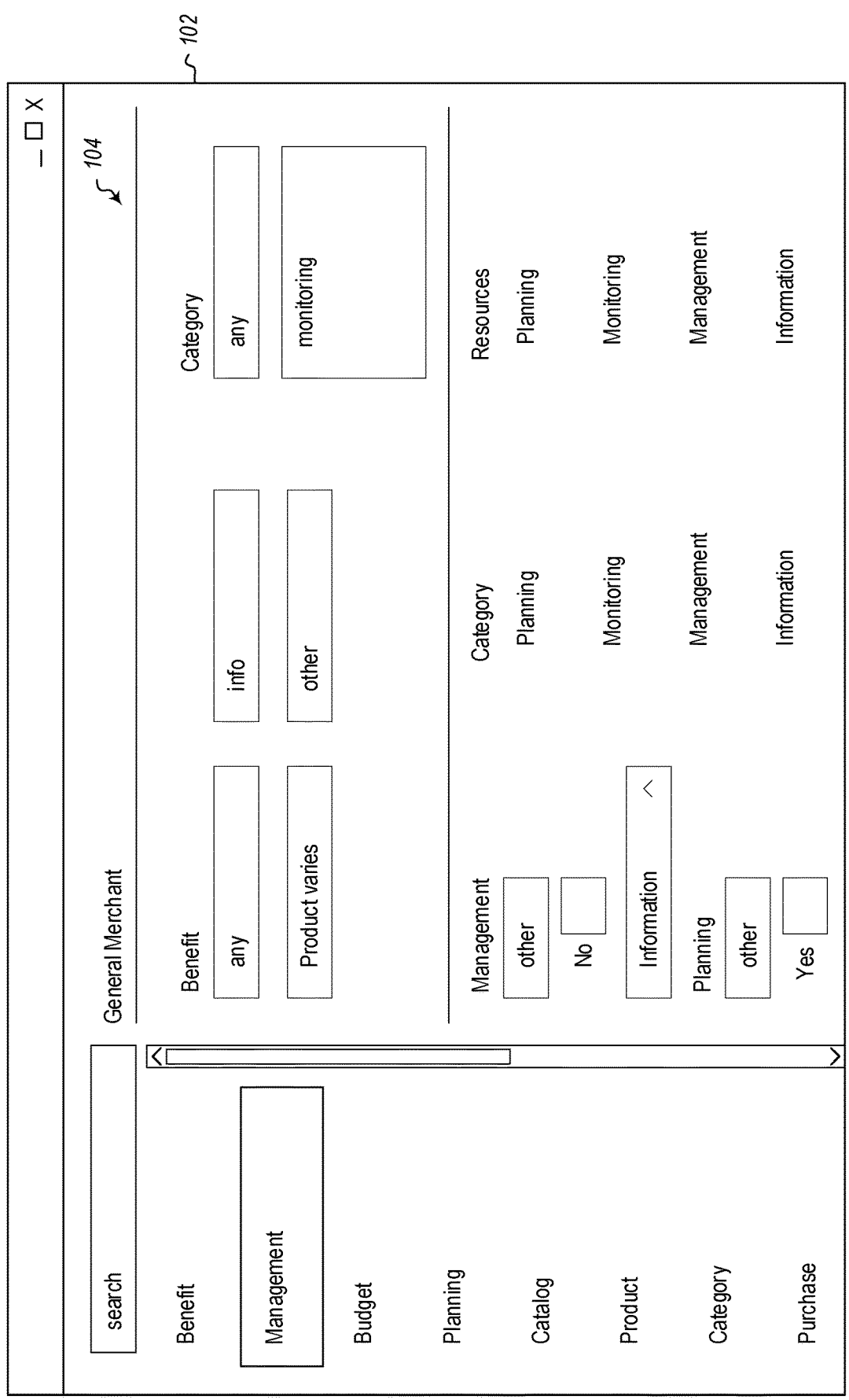
FIG. 1C illustrates the graphical user interface window with a modal dialog hidden.

As illustrated in FIG. 1C, information is identified indicating that the modal dialog should be hidden. Various different kinds of information may be identified. For example, in some embodiments, user input may be identified indicating that the user wishes for the modal dialog box to be hidden. In one illustrative example, the user clicks and holds on any area outside of the modal dialog 106, which causes the modal dialog to become invisible (e.g., transparent or opacity of 0) as illustrated in FIG. 1C. However, the user would still not be able to modify the data 104 or cause the application to proceed along the logical processing path. In some embodiments, however the user would be able to navigate the data without being able to modify it.

Various other user input may be identified in other embodiments. Further, in some embodiments, agents other than the user may be provide information indicating that the modal dialog should be hidden. For example, a plug-in or agent running on a machine could cause the modal dialog 106 to be displayed for a period of time to allow the user to view the modal dialog. Then the modal dialog could be hidden as a result of input from the plug-in or other agent. Examples for various different embodiments will be illustrated in more detail below.

However, returning now to the instant example, when the user releases the mouse button, the modal dialog 106 re-appears. The user may click or otherwise interact the interrupting modal dialog 106 in any intended manner (such as selecting and copying the text, adding data at a prompt provided in the modal dialog 106, interacting with controls, etc.

In some embodiments, the illustrated functionality can be accomplished by providing a dynamic opacity to the modal dialog with a subtle transition to the user to express that the form is being temporarily hidden: The following illustrates commented code illustrating how one embodiment might be implemented.

```
.lightbox-container {
    .modalBackground,
    .popupShadow {
        z-index: @LightBoxZIndex;
    }
    background-color:fade(@ModalBackground, 0%);
    &:active {
        box-shadow: none;
        .lightbox {
            opacity: 0;
        }
    }
}
.lightbox {
    &:active {
        opacity: 1 !important; // Needs to override the active state of the
lightbox-container so it is visible when directly pressed.
    }
    transition: opacity @timing-basic ease-in-out;
    background-color:@Light;
    color: @Dark;
    min-height:@lightBoxMinHeight;
    max-height:66%;
    width:100%;
    .box-sizing(border-box);
    position:fixed;
    top:30%;
    overflow: hidden;
    box-shadow: 0 0 (@subUnit + (@subUnit / 2)) 0 @DarkGray;
    /* Center the rootContent in the window. */
    > .rootContent-lightBox {
        margin-left: auto;
        margin-right: auto;
        width: (@lightBoxContentWidth + (@lightBoxImageSize * 1.33)); /* Room for the lightbox text plus the error symbol*/
        min-height: @lightBoxMinHeight;
        overflow: hidden;
    }
    /* Treat the titleField as the title of the form. Make it a heading. */
    .titleField {
        font:@MediumHeadingFont;
        display:inline;
        margin-left: @margin;
        margin-top:@margin;
        white-space:normal;
        color:@Dark !important; /* There is an override for this in
another place that prevents the cascade from working, thus the need to
specify here as well. */
    }
    /* And don't display the actual formCaption */
    .formCaption {
        display: none;
    }
}
```

Various alternative embodiments and example are now illustrated.

As discussed above, information indicating that the modal dialog should be hidden can come from a number of different locations. For example, the information may be the result of user input.

For example, as illustrated above, various mouse or other pointing device interactions may be implemented. In the example illustrated above, a user clicks and holds a mouse pointer outside of the modal dialog 106, but within the graphical user interface window 102. However, other embodiments may have other mouse interactions. For example, a user could right click a modal dialog 106 and select a "hide" option. Alternatively, the user could double click the modal dialog 106 causing the modal dialog to disappear for a predetermined amount of time. Alternatively, the user could perform some unique mouse gesture, such as a flick or swipe that would cause the modal dialog 106 to be hidden. Other alternatives may be implemented.

In alternative or additional embodiments, keyboard interactions may be used to provide information indicating that a modal dialog should be hidden. For example, a user may use certain function keys, or hot-key combinations to indicate that a modal dialog 106 should be hidden.

In alternative or additional embodiments, a touch interaction may be used to provide information indicating that a modal dialog 106 should be hidden. For example, touch screen gestures, touching certain areas of a touch screen, etc. may be used to determine that a modal dialog 106 should be hidden.

In alternative or additional embodiments, optical/video interaction may be used to provide information indicating that a modal dialog should be hidden. For example, various camera devices may be used to identify user movement. Certain user movements, such as a wave, held posture, eye movement, etc. may be used by the user to indicate that they would like the modal dialog 106 hidden and used by the system to identify that the modal dialog should be hidden.

In alternative or additional embodiments, voice interaction may be used to provide information indicating that a modal dialog 106 should be hidden. For example, a user may use a voice command to indicate a desire to have a modal dialog 106 hidden. The system can use the presence of a voice command to determine that the modal dialog 106 should be hidden.

In alternative or additional embodiments, an authentication interaction may be used to provide information indicating that a modal dialog 106 should be hidden. For example, some modal dialogs may require some form of user authentication before the modal dialog can be hidden. For example, a certain key sequence token may indicate that the modal dialog 106 should be hidden. Alternatively or additionally, biometric input such as fingerprint input data, retina scan input data, facial recognition input data, etc., can be used to indicate that a modal dialog 106 should be hidden. In particular, the modal dialog may be used to obscure the data for security reasons. Biometric or other authentication input may be used to determine that the data can be revealed by hiding the modal dialog 106. In some embodiments, authentication interaction may be combined with other interactions to indicate and allow the modal dialog to be hidden. For example, in some embodiments, a user may need to perform a mouse gesture followed by some authentication action to cause the modal dialog 106 to be hidden.

In an alternative example, embodiments may identify information from an agent other than a user indicting that the modal dialog 106 should be hidden. For example, some embodiments may identify other agent input, such as an application plug-in or user account agent. For example, an agent may be able to identify that a modal dialog 106 has been displayed. The agent can then perform some action or provide some information indicating that the modal dialog 106 should be hidden. For example, the agent may cause the modal dialog 106 to be hidden and alternatively displayed periodically for a short period of time. In some embodiments, the period of time and amount of time the modal dialog 106 is displayed vs. the amount of time the modal dialog is hidden may be configured by a user. In another example, the agent may be configured to provide information indicating that a modal dialog 106 should be hidden based on types of user input. For example, if the modal dialog requires a user to select a button with a mouse, a user using a keyboard would cause the modal dialog to be hidden. Once the user used the mouse, the modal dialog would be unhidden. In some embodiments, such an agent may be includes as part of the operating system.

Figure 1D:
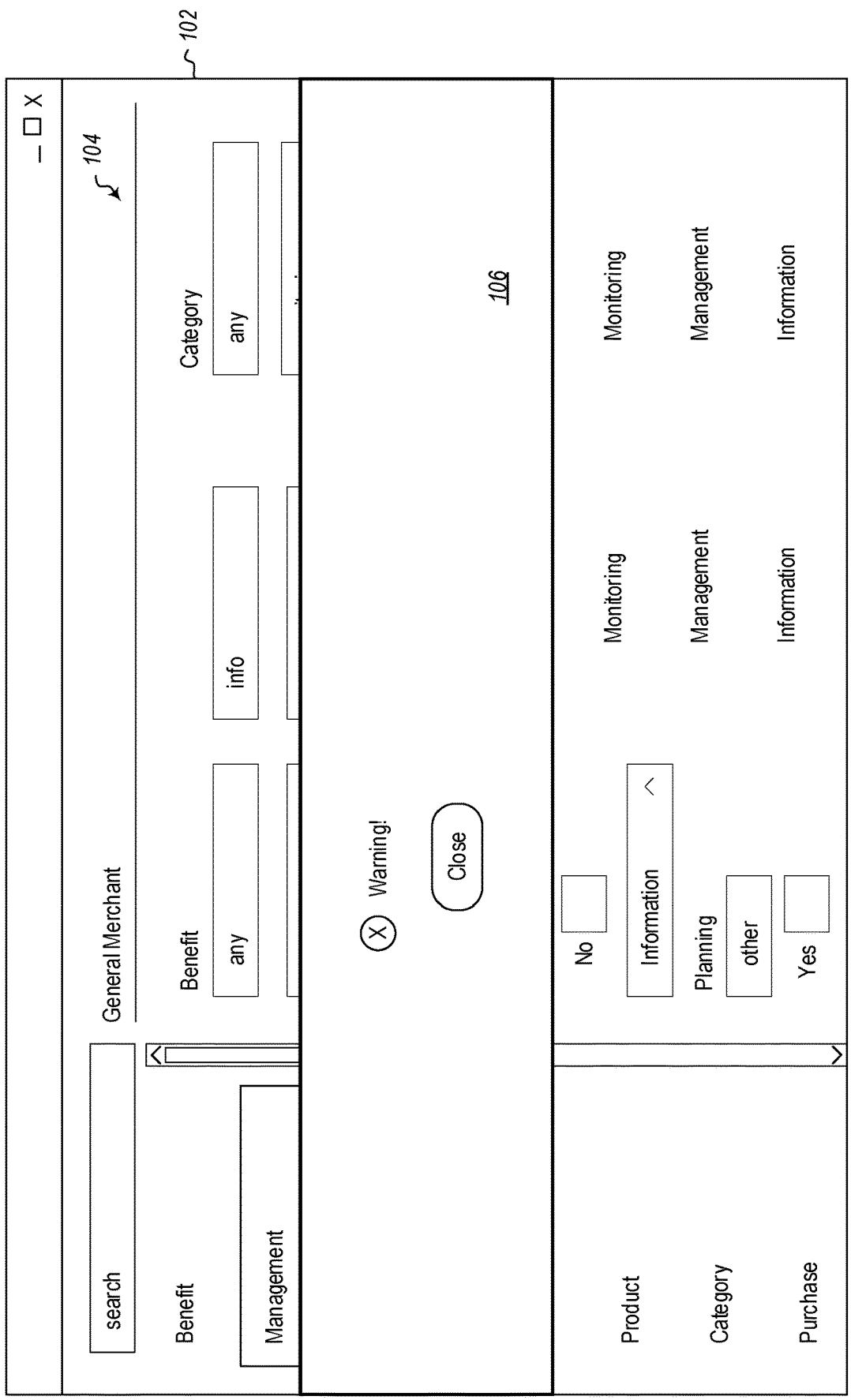
FIG. 1D illustrates the graphical user interface window with a modal dialog re-displayed.
Figure 1E:
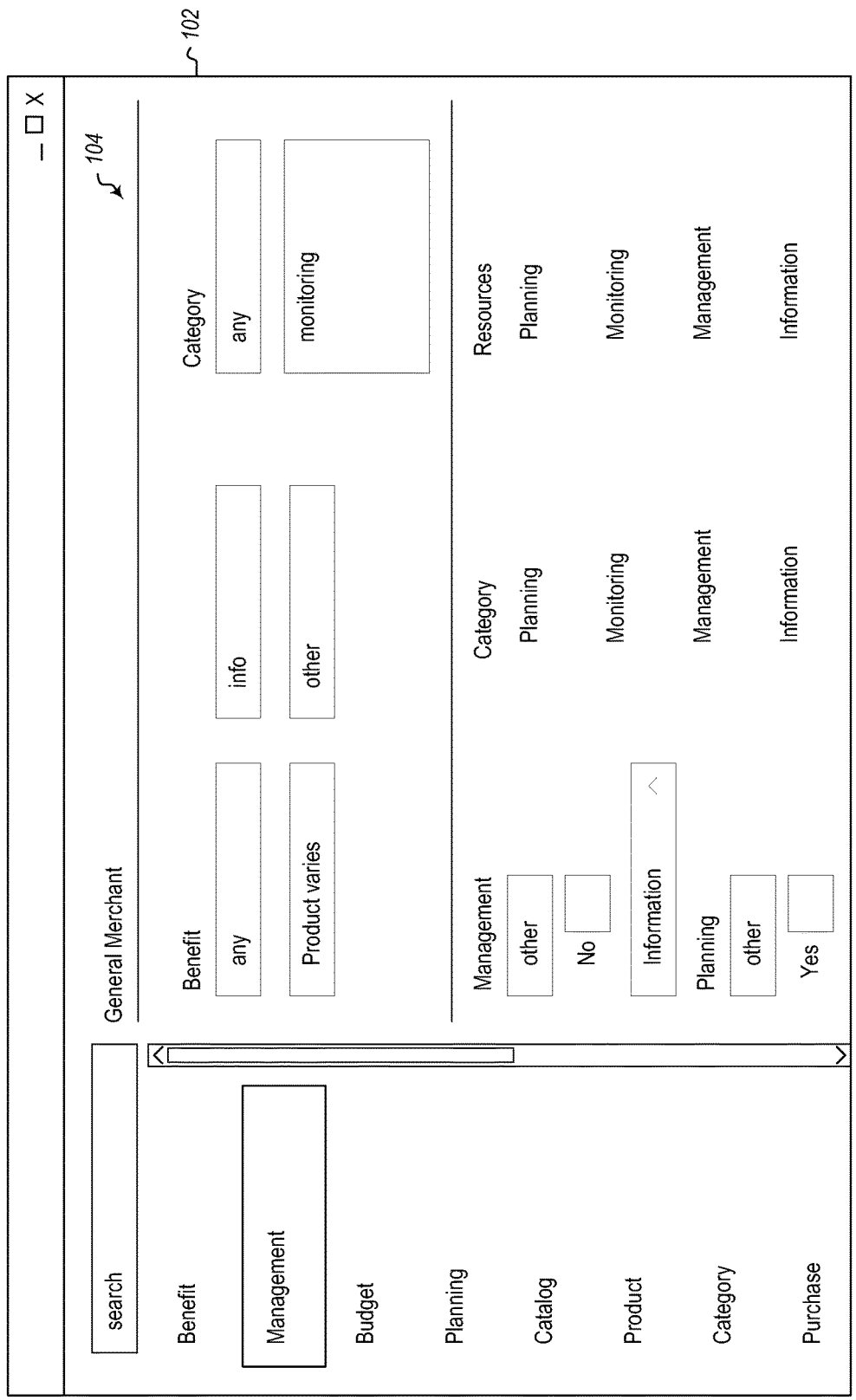
FIG. 1E illustrates the graphical user interface window with a modal dialog dispatched.

The modal dialog may be overlaid in a number of different fashions. For example, in some embodiments, the modal dialog may completely cover and completely obscure the graphical user interface window. In other embodiments, the modal dialog may completely cover the graphical user interface window, but portions of the modal dialog may be at least partially transparent allowing portions of the graphical user interface window to be viewed, or at least viewed but with shading or other partial but non-complete obstruction. Examples of this are illustrated in FIGS. 1B and 1D.

Figure 2:
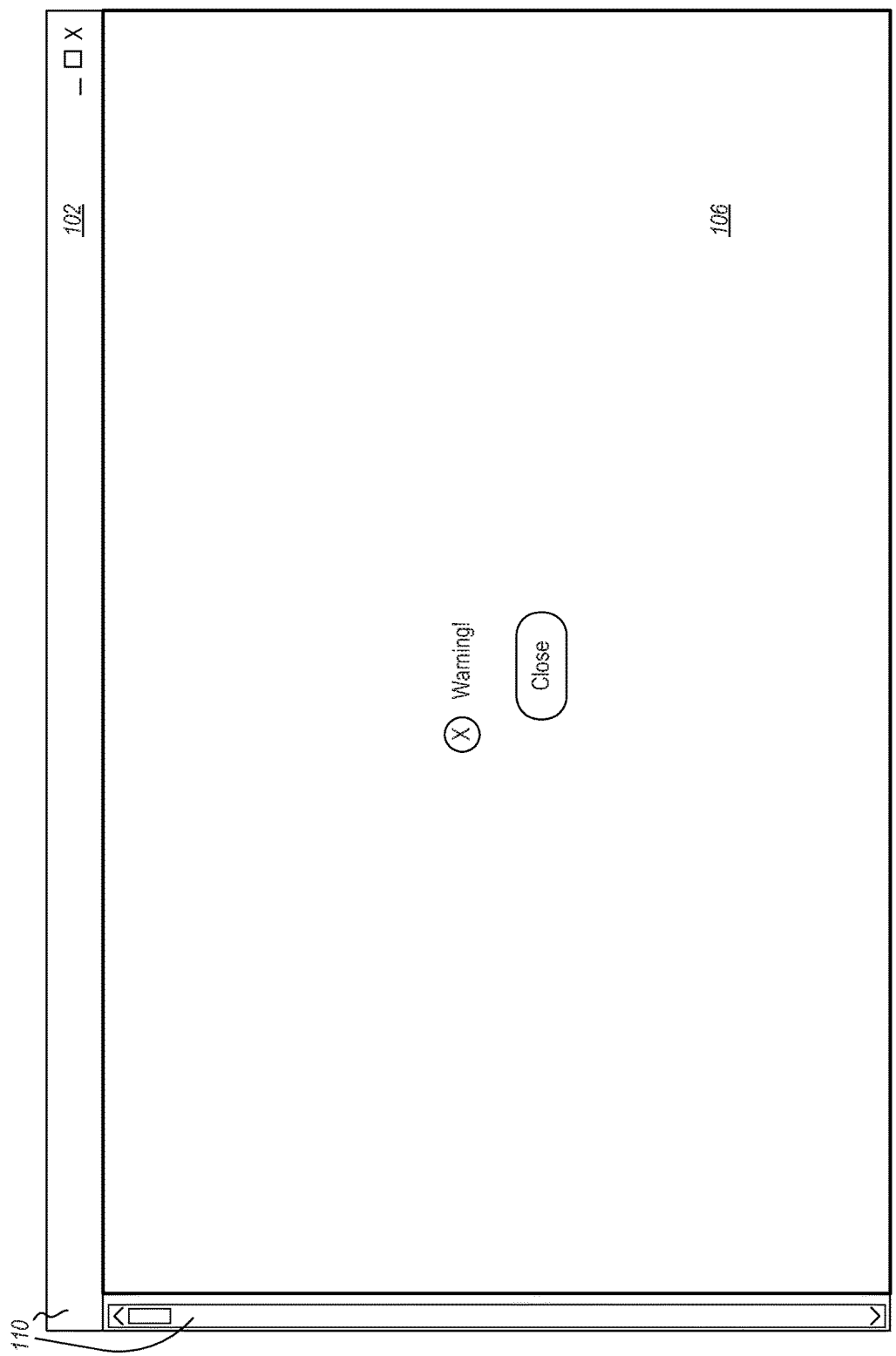
FIG. 2 illustrates a corner slide example of displaying the modal dialog.

In an alternative example, a corner slide interaction may be implemented. In a corner slide example, the modal dialog is slid onto the graphical user interface window up to some margins; on the graphical user interface window. For example, as illustrated in FIG. 2, the modal dialog 106 is overlaid on the graphical user interface window 102 up to the margins 110.

Embodiments may be configured to prevent user input from modifying the data in the graphical user interface window so long as the modal dialog remains active, even when the modal dialog is hidden. The can be accomplished in a number of different ways. For example, in some of embodiments, the modal dialog may intercept any user input. If the user input is non-responsive to the modal dialog, i.e., is not appropriate input for addressing the issues the modal dialog, the modal dialog can discard such data, or ignore such data.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
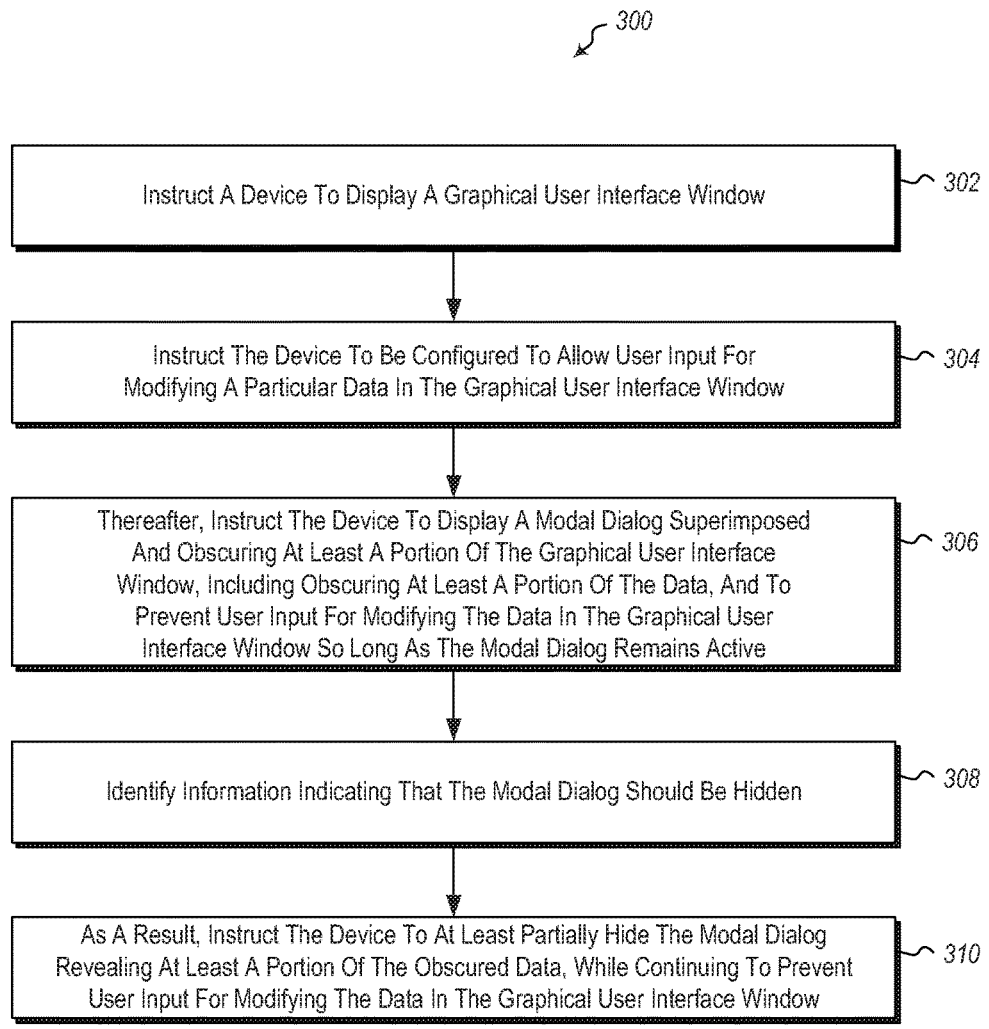
FIG. 3 illustrates a method of allowing a user to interrogate or navigate a data in a user interface when a modal dialog box has been activated.

Referring now to FIG. 3, a method 300 is illustrated. The method 300 may be practiced in a computing environment and includes acts for allowing a user to interrogate or navigate a data (although not change the data) in a user interface when a modal dialog box has been activated. For example, the method 300 may be practiced in a server/client environment, cloud based service environment, or some other similar environment.

Figure 4:
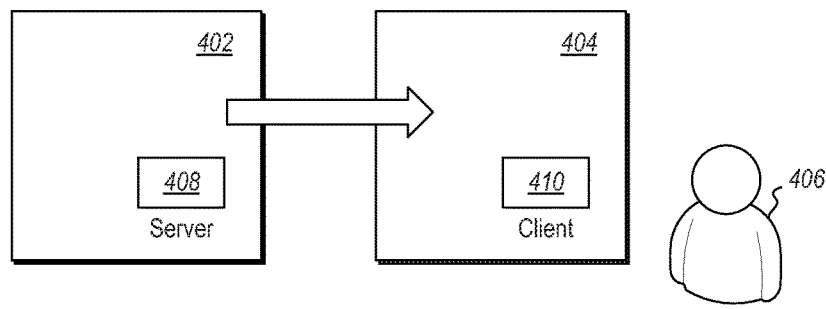
FIG. 4 illustrates a server/client environment.

The method includes instructing a device to display a graphical user interface window (act 302). For example, as illustrated in FIG. 4, a server 402 may instruct a client 404 to display a graphical user interface window, such as the graphical user interface window 102 illustrated in FIG. 1A.

The method 300 may further include instructing the device to be configured to allow user input for modifying a particular data in the graphical user interface window (act 304). For example, the server 402 may instruct the client 404 to allow a user 406 to modify a data displayed in the graphical user interface at the client 404.

Subsequently, the method 300 includes instructing the device to display a modal dialog superimposed and obscuring at least a portion of the graphical user interface window, including obscuring at least a portion of the data, and to prevent user input for modifying the data in the graphical user interface window so long as the modal dialog remains active (act 306). Thus, for example, the server 402 may instruct the client 404 to display the modal dialog 106 in the graphical user interface 102 covering at least a portion of the data 104 and preventing the user 406 from modifying the data 104.

The method 300 further includes identifying information indicating that the modal dialog should be hidden (act 308). For example, the server 402 may identify information that the modal dialog 106 should be, at least partially, hidden. For example, in some embodiments, the server 402 may identify user input from the user 406 at the client 404. For example, the method 300 may be practiced where identifying information indicating that the modal dialog should be hidden comprises identifying a hot key interaction. Alternatively or additionally, the method 300 may be practiced where identifying information indicating that the modal dialog should be hidden comprises identifying a mouse/cursor interaction. Alternatively or additionally, the method 300 may be practiced where identifying information indicating that the modal dialog should be hidden comprises identifying a touch interaction. Alternatively or additionally, the method 300 may be practiced where identifying information indicating that the modal dialog should be hidden comprises identifying an optical/video interaction. Alternatively or additionally, the method 300 may be practiced where identifying information indicating that the modal dialog should be hidden comprises identifying a voice interaction. Alternatively or additionally, the method 300 may be practiced where identifying information indicating that the modal dialog should be hidden comprises identifying an authentication interaction. Alternatively or additionally, the method 300 may be practiced where identifying information indicating that the modal dialog should be hidden comprises identifying a biometric interaction (e.g., when the data is obscured by the modal dialog for security reasons). Note that in other embodiments, as illustrated above, information may be identified from other agents. For example an agent 408 on the server 402 may be configured to provide information indicating that the modal dialog 106 should be hidden. Alternatively or additionally, an agent 410 at the client 404 may provide information that is identified by the server 402 indicating that the modal dialog 106 should be hidden.

As a result, the method further includes instructing the device to at least partially hide the modal dialog revealing at least a portion of the obscured data, while continuing to prevent user input for modifying the data in the graphical user interface window (act 310). Thus, for example, the server 402 may instruct the client 404 to hide the modal dialog 106 to reveal at least a portion of the data 104 in the graphical user interface window 102.

In some embodiments, the method 300 may be practiced where instructing the device to at least partially hide the modal dialog revealing at least a portion of the obscured data includes instructing the device to change the opacity of the modal dialog. For example, the server 402 may instruct the client 404 to change the opacity of the modal dialog 106. In some embodiments, the server may instruct the client 404 to change the opacity of the modal dialog 106 to be completely transparent (e.g., to have an opacity of 0 as illustrated in the code example above).

In some embodiments, the method 300 may be practiced where instructing the device to at least partially hide the modal dialog revealing at least a portion of the obscured data includes instructing the device to move the modal dialog. For example, the server 402 may instruct the client 404 to move the modal dialog 106 to a less obtrusive portion of the screen such that the graphical user interface window 102 and at least a portion of the data 104 is revealed. In one example embodiment, the modal dialog may be moved to an a area of a screen not displaying the graphical user interface window 102, to a different screen in a multi-screen environment, or to a graphical location which does not have a corresponding physical screen location (i.e., the modal dialog may be moved off-screen).

In some embodiments, the method 300 may be practiced where instructing the device to at least partially hide the modal dialog revealing at least a portion of the obscured data includes instructing the device to stop displaying the modal dialog. Thus, for example, the server 402 may instruct the client 404 to stop displaying the modal dialog 106.

The method 300 may be practiced where preventing user input for modifying the data in the graphical user interface window so long as the modal dialog remains active comprises instructing the modal dialog to intercept user input directed at the graphical user interface window. Thus for example, the server 402 may instruct the client 404, and in particular a modal dialog 106 at the client 404 to intercept user input from the user 406 at the client 404. In some embodiments, the server 402 may instruct the client 404 to cause the modal dialog to discard intercepted user input. Alternatively or additionally, the server 402 may instruct the client 404 to cause the modal dialog to ignore intercepted user input. In particular, discarded or ignored user input may be input that does not address an alert for the modal dialog 106.

Figure 5:
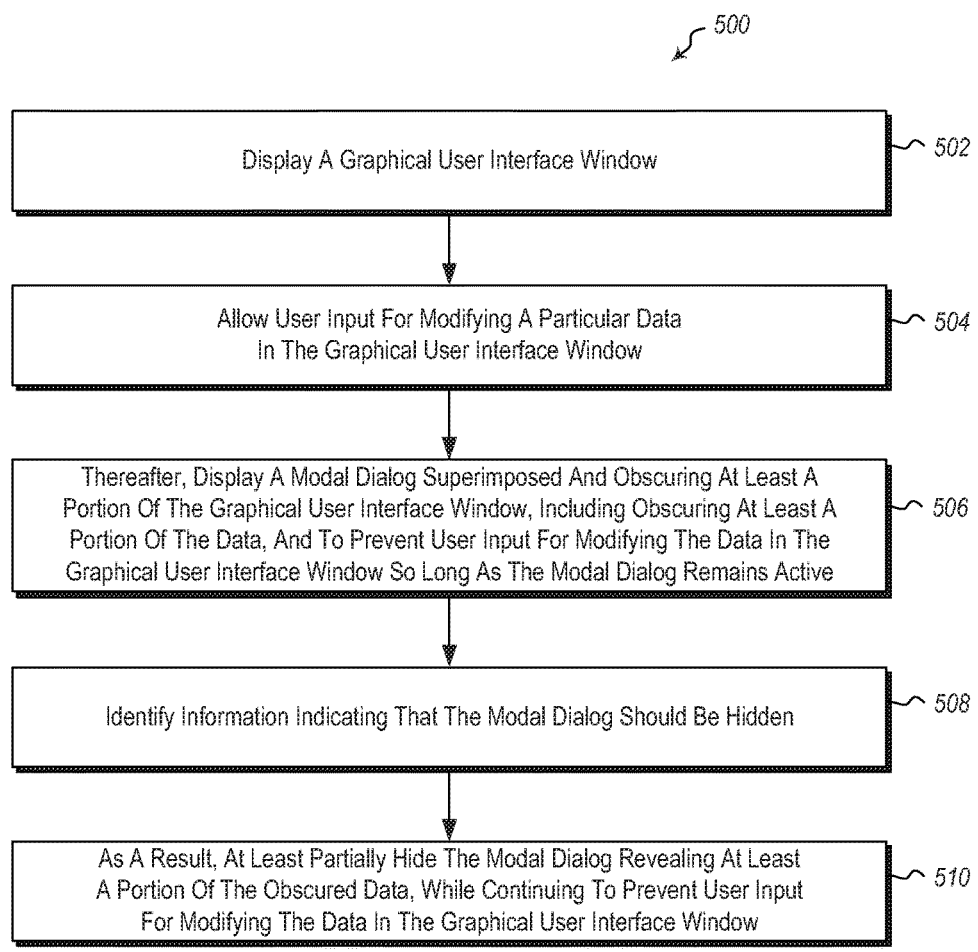
FIG. 5 illustrates another method of allowing a user to interrogate or navigate a data (although not change the data) in a user interface when a modal dialog box has been activated

Referring now to FIG. 5, a method 500 is illustrated. The method 500 may be practiced in a computing environment and includes acts for allowing a user to interrogate or navigate a data (although not change the data) in a user interface when a modal dialog box has been activated. For example, the method 500 may be practiced in a device environment, or some other similar environment.

The method includes displaying a graphical user interface window (act 502). For example, a device displays a graphical user interface window, such as the graphical user interface window 102 illustrated in FIG. 1A.

The method 500 may further include the device allowing user input for modifying a particular data in the graphical user interface window (act 504). For example, a device may allow a user to modify a data displayed in the graphical user interface at the device.

Subsequently, the method 500 displaying a modal dialog superimposed and obscuring at least a portion of the graphical user interface window, including obscuring at least a portion of the data, and to prevent user input for modifying the data in the graphical user interface window so long as the modal dialog remains active (act 506). Thus, for example, the device may display the modal dialog 106 in the graphical user interface 102 covering at least a portion of the data 104 and preventing the user from modifying the data 104.

The method 500 further includes identifying information indicating that the modal dialog should be hidden (act 508). For example, the device may identify information that the modal dialog 106 should be, at least partially, hidden. For example, in some embodiments, the device may identify user input from the user at the device. For example, the method 500 may be practiced where identifying information indicating that the modal dialog should be hidden comprises identifying a hot key interaction. Alternatively or additionally, the method 500 may be practiced where identifying information indicating that the modal dialog should be hidden comprises identifying a mouse/cursor interaction. Alternatively or additionally, the method 500 may be practiced where identifying information indicating that the modal dialog should be hidden comprises identifying a touch interaction. Alternatively or additionally, the method 500 may be practiced where identifying information indicating that the modal dialog should be hidden comprises identifying an optical/video interaction. Alternatively or additionally, the method 500 may be practiced where identifying information indicating that the modal dialog should be hidden comprises identifying a voice interaction. Alternatively or additionally, the method 500 may be practiced where identifying information indicating that the modal dialog should be hidden comprises identifying an authentication interaction. Alternatively or additionally, the method 500 may be practiced where identifying information indicating that the modal dialog should be hidden comprises identifying a biometric interaction (e.g., when the data is obscured by the modal dialog for security reasons). Note that in other embodiments, as illustrated above, information may be identified from other agents. For example an agent on the device may be configured to provide information indicating that the modal dialog 106 should be hidden.

As a result, the method further includes at least partially hiding the modal dialog revealing at least a portion of the obscured data, while continuing to prevent user input for modifying the data in the graphical user interface window (act 510). Thus, for example, the device may hide the modal dialog 106 to reveal at least a portion of the data 104 in the graphical user interface window 102.

In some embodiments, the method 500 may be practiced where at least partially hiding the modal dialog revealing at least a portion of the obscured data includes instructing the device to change the opacity of the modal dialog. For example, the device may change the opacity of the modal dialog 106. In some embodiments, the device may change the opacity of the modal dialog 106 to be completely transparent (e.g., to have an opacity of 0 as illustrated in the code example above).

In some embodiments, the method 500 may be practiced where at least partially hiding the modal dialog revealing at least a portion of the obscured data includes moving the modal dialog. For example, the device may move the modal dialog 106 to a less obtrusive portion of the screen such that the graphical user interface window 102 and at least a portion of the data 104 is revealed. In one example embodiment, the modal dialog may be moved to an a area of a screen not displaying the graphical user interface window 102, to a different screen in a multi-screen environment, or to a graphical location which does not have a corresponding physical screen location (i.e., the modal dialog may be moved off-screen).

In some embodiments, the method 500 may be practiced where at least partially hiding the modal dialog revealing at least a portion of the obscured data includes stopping displaying the modal dialog. Thus, for example, the device may stop displaying the modal dialog 106.

The method 500 may be practiced where preventing user input for modifying the data in the graphical user interface window so long as the modal dialog remains active comprises the modal dialog intercepting user input directed at the graphical user interface window. Thus for example, the device, and in particular a modal dialog 106 at the device may intercept user input from the user at the device. In some embodiments, the device may cause the modal dialog to discard intercepted user input. Alternatively or additionally, the device may cause the modal dialog to ignore intercepted user input. In particular, discarded or ignored user input may be input that does not address an alert for the modal dialog 106.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data res. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks, in a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, implemented by a computer system that includes one or more processors, of allowing navigation of data in a user interface when a modal dialog box has been activated, the method comprising:
   displaying, at a display device, a graphical user interface window, including displaying particular data within the graphical user interface window;
   allowing, by the one or more processors, user input to modify the particular data displayed within the graphical user interface window;
   thereafter, displaying, at the display device, a modal dialog superimposed upon and obscuring at least a portion of the graphical user interface window, including obscuring at least a portion of the particular data;
   based at least on the displaying the modal dialog superimposed upon and obscuring the at least a portion of the graphical user interface window, preventing, by the one or more processors, user input from modifying the particular data displayed within the graphical user interface window so long as the modal dialog remains in an active state;
   after displaying the modal dialog superimposed upon and obscuring the at least a portion of the graphical user interface window, identifying, by the one or more processors, information indicating that the modal dialog should both be hidden and remain in the active state; and
   as a result, maintaining, by the one or more processors, the modal dialog in the active state, while entirely hiding the modal dialog, thereby revealing the at least a portion of the graphical user interface window that was obscured, such that the at least a portion of the particular data that was obscured is now viewable, while continuing to prevent user input from modifying the particular data displayed within the graphical user interface window.

2. The method of claim 1, wherein entirely hiding the modal dialog comprises changing an opacity of the modal dialog to completely transparent.

3. The method of claim 1, wherein entirely hiding the modal dialog comprises moving the modal dialog onto a margin of the graphical user interface window.

4. The method of claim 1, wherein entirely hiding the modal dialog comprises stopping display of the modal dialog.

5. The method of claim 1, wherein preventing user input for modifying the particular data displayed within the graphical user interface window so long as the modal dialog remains in the active state comprises intercepting user input directed at the graphical user interface window.

6. The method of claim 5, wherein preventing user input for modifying the particular data displayed within the graphical user interface window comprises discarding intercepted user input.

7. The method of claim 5, wherein preventing user input for modifying the particular data displayed within the graphical user interface window comprises ignoring intercepted user input.

8. The method of claim 1, wherein identifying information indicating that the modal dialog should be hidden comprises identifying a hot key interaction.

9. The method of claim 1, wherein identifying information indicating that the modal dialog should be hidden comprises identifying at least one of a mouse or a cursor interaction.

10. The method of claim 1, wherein identifying information indicating that the modal dialog should be hidden comprises identifying a touch interaction.

11. The method of claim 1, wherein identifying information indicating that the modal dialog should be hidden comprises identifying at least one of an optical or a video interaction.

12. The method of claim 1, wherein identifying information indicating that the modal dialog should be hidden comprises identifying a voice interaction.

13. The method of claim 1, wherein identifying information indicating that the modal dialog should be hidden comprises identifying an authentication interaction.

14. The method of claim 1, wherein identifying information indicating that the modal dialog should be hidden comprises identifying a biometric interaction.

15. A system comprising:
   one or more processors;
   a display device; and one or more hardware storage devices having stored thereon instructions that are executable by the one or more processors to configure the system to allow navigation of data in a user interface when a modal dialog box has been activated, the instructions including instructions that are executable to configure the computer system to perform at least the following:

display, at the display device, a graphical user interface window, including displaying particular data within the graphical user interface window;

allow user input to modify the particular data displayed within the graphical user interface window;

thereafter, display, at the display device, a modal dialog superimposed upon and obscuring at least a portion of the graphical user interface window, including obscuring at least a portion of the particular data;

based at least on the displaying the modal dialog superimposed upon and obscuring the at least a portion of the graphical user interface window, prevent, by the computer system, user input from modifying the particular data displayed within the graphical user interface window so long as the modal dialog remains in an active state;

after displaying the modal dialog superimposed upon and obscuring the at least a portion of the graphical user interface window, identify information indicating that the modal dialog should both be hidden and remain in the active state; and as a result, maintain, by the computer system, the modal dialog in the active state, and entirely hiding the modal dialog, thereby revealing the at least a portion of the graphical user interface window that was obscured, such that the at least a portion of the particular data that was obscured is now viewable, while continuing to prevent user input from modifying the particular data displayed within the graphical user interface window.

16. The system of claim 15, wherein entirely hiding the modal dialog comprises moving the modal dialog onto a margin of the graphical user interface window.

17. The system of claim 15, wherein entirely hiding the modal dialog comprises stopping display of the modal dialog.

18. The system of claim 15, wherein preventing user input for modifying the particular data displayed within the graphical user interface window so long as the modal dialog remains in the active state comprises intercepting user input directed at the graphical user interface window.

19. The system of claim 15, wherein identifying information indicating that the modal dialog should be hidden comprises identifying at least one of a hot key interaction, a mouse interaction, a cursor interaction, a touch interaction, an optical interaction, a video interaction, a voice interaction, an authentication interaction, or a biometric interaction.

20. A hardware storage device having stored thereon instructions that are executable by one or more processors to configure a computer system to allow navigation of data in a user interface when a modal dialog box has been activated, the instructions including instructions that are executable to configure the computer system to perform at least the following:

display, at a display device of the computer system, a graphical user interface window, including displaying particular data within the graphical user interface window;

allow first user input received by the computer system to modify the particular data displayed within the graphical user interface window;

thereafter, display, at the display device, a modal dialog superimposed upon and obscuring at least a portion of the graphical user interface window, including obscuring at least a portion of the particular data;

based at least on displaying the modal dialog superimposed upon and obscuring the at least a portion of the graphical user interface window at the display device, prevent any user input received by the computer system from modifying the particular data displayed within the graphical user interface window so long as the computer system maintains the modal dialog in an active state;

after displaying the modal dialog superimposed upon and obscuring the at least a portion of the graphical user interface window, identify second user input received by the computer system indicating that the modal dialog should both be hidden and remain in the active state; and as a result, maintain the modal dialog in the active state at the display device, and entirely hide the modal dialog at the display device, thereby revealing the at least a portion of the graphical user interface window that was obscured, such that the at least a portion of the particular data that was obscured is now viewable at the display device, while continuing to prevent any user input received by the computer system from modifying the particular data displayed within the graphical user interface window.

* * * * *